United States Patent
Foy et al.

(10) Patent No.: US 6,286,841 B1
(45) Date of Patent: Sep. 11, 2001

(54) WEATHER SEAL WITH RESERVOIR STRUCTURE

(75) Inventors: Martin J. Foy, Ashby-de-la-Zouch (GB); Steve H. Riley, Maryville, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/223,607

(22) Filed: Dec. 30, 1998

(51) Int. Cl.[7] ............................................. F16J 15/10
(52) U.S. Cl. ........................ 277/651; 277/654; 428/308.4; 428/317.1
(58) Field of Search ........................... 277/637, 641, 277/645, 651, 654, 906, 921, FOR 244; 428/90, 308.4, 82, 83, 317.1, 159, 31; 442/326

(56) References Cited

U.S. PATENT DOCUMENTS

| | | | |
|---|---|---|---|
| 3,758,992 | * 9/1973 | Olson ..................................... | 428/90 |
| 3,819,464 | * 6/1974 | Ungerer ................................. | 428/90 |
| 4,061,820 | * 12/1977 | Magid et al. ......................... | 428/308.4 |
| 4,314,872 | 2/1982 | Schiesser . | |
| 4,442,156 | 4/1984 | Yamaguchi . | |
| 4,643,923 | 2/1987 | Bernitz et al. . | |
| 4,969,293 | 11/1990 | Guillon . | |
| 5,005,317 | 4/1991 | Saint-Louis Augustin et al. . | |
| 5,125,185 | 6/1992 | Shiota et al. . | |
| 5,143,772 | * 9/1992 | Iwasa .................................... | 428/31 |
| 5,332,600 | * 7/1994 | Iwasa .................................... | 428/90 |
| 5,389,409 | * 2/1995 | Iwasa et al. .......................... | 428/31 |
| 5,527,583 | * 6/1996 | Nozaki et al. ........................ | 428/31 |
| 5,817,414 | * 10/1998 | Ando ..................................... | 428/31 |
| 5,866,232 | 2/1999 | Gatzmanga . | |
| 5,948,499 | * 9/1999 | Tsukada et al. ...................... | 428/90 |
| 6,136,415 | * 10/2000 | Spengler .......................... | 428/159 X |

FOREIGN PATENT DOCUMENTS

| | | |
|---|---|---|
| 0390568 | 10/1990 | (EP) . |
| 0612568 | 8/1994 | (EP) . |
| 0855303A1 | 7/1998 | (EP) . |
| 2279985 | 1/1995 | (GB) . |

* cited by examiner

Primary Examiner—Robert J. Sandy
Assistant Examiner—Karlena D Schwing
(74) Attorney, Agent, or Firm—Brian B. Shaw, Esq.; Stephen B. Salai, Esq.; Harter, Secrest & Emery LLP

(57) ABSTRACT

A seal for releasably engaging a movable panel such as a glass panel in a motor vehicle is disclosed, the seal has a base with an open celled reservoir layer connected to the base and a contact layer connected to the reservoir layer by an adhesive retained at least partially in the cell structure.

19 Claims, 4 Drawing Sheets

WEATHER SEAL WITH RESERVOIR STRUCTURE

FIELD OF THE INVENTION

The present invention relates to motor vehicle seals such as door, decklid, hood-to-cowl, sunroof and window seals, and more particularly, to seals for releasably contacting a glass panel, wherein the seal includes a contacting surface connected to a base by an adhesive and a reservoir layer.

BACKGROUND OF THE INVENTION

The use of movable panels, and particularly glass panels in motor vehicles has presented numerous sealing problems since their first use. These problems include the durability of the seal, the ability of the seal to selectively release from the glass and permit a sliding association of the seal and the glass, as well as the ability of the seal to preclude the migration of air, water and noise between the seal and the glass.

In addition, the advances in motor vehicle design have created further demands on seals including varying profile configurations and enhanced performance. Economic demands require more efficient production of the seals including reduced material costs. Quality demands require special seal configurations.

A number of plastic and elastomeric compounds including thermoplastic and thermosetting materials and combinations thereof have been employed in prior seal designs. The seals are designed to reduce the migration of air, water and noise across the seal as well as provide reduced resistance to separation of the glass from the seal. Various contact surfaces have been employed to reduce the retention force between the glass and the seal. The contact surfaces include thermoplastic materials, thermosetting materials, felt, pile, slip coatings, flock and other materials having a reduced coefficient of friction.

U.S. Pat. No. 5,343,609 describes improved vehicle door or window channel seals that have two members, a substantially rigid first carrier member thermally formed from a hard, rigid or semi-rigid plastic and a soft plastic, and a second sealing member made from resilient material, preferably rubber. The first sealing member comprises a dual durometer, thermoplastic elastomer (TPE) which attaches to the vehicle body and can be color matched to an automobile. The first member is thermally formed by extrusion or molding in one piece and immediately conformed to the contour of the vehicle opening. The second sealing member can be formed by extrusion of a one piece, relatively flat, rubber insert which can be readily provided with a sliding surface, such as a slip coating or flock.

However, even in such seals there are difficulties in applying the flock to the seal. In particular, the specific location of the flock as well as the materials required in attaching the flock are difficult to provide within desired tolerances. Therefore, the need exists for a seal that can be readily manufactured. The need also exists for a seal having reduced resistance to initial motion relative to the seal. A further need exists for a quality seal having an accurately located contacting surface.

SUMMARY OF THE INVENTION

The present invention provides a seal having a contacting layer connected to a base by an intermediate reservoir layer and an adhesive.

In a preferred configuration, the seal includes a base and a reservoir layer on a portion of the base, the reservoir layer having a multiplicity of open cells and an adhesive disposed in the multiplicity of open cells. The contacting layer is located on the adhesive and thus bound to the reservoir layer and the base. The contacting layer may be formed of a variety of materials such as flock or a ribbon of lubricious material.

In another construction, the base may be connected to a frame for mounting to a motor vehicle, or be formed of a material to allow integration into an operable environment.

In a further configuration, the reservoir layer may be formed to include open cells, closed cells or a mixture of such cells. It is also contemplated the open cell structure of the reservoir layer may be formed with cavities, pits, pockets or recesses to locate the adhesive and hence the contacting layer in a desired location.

DETAILED DESCRIPTION OF THE PREFERRED EMBODIMENT

Figure 1:
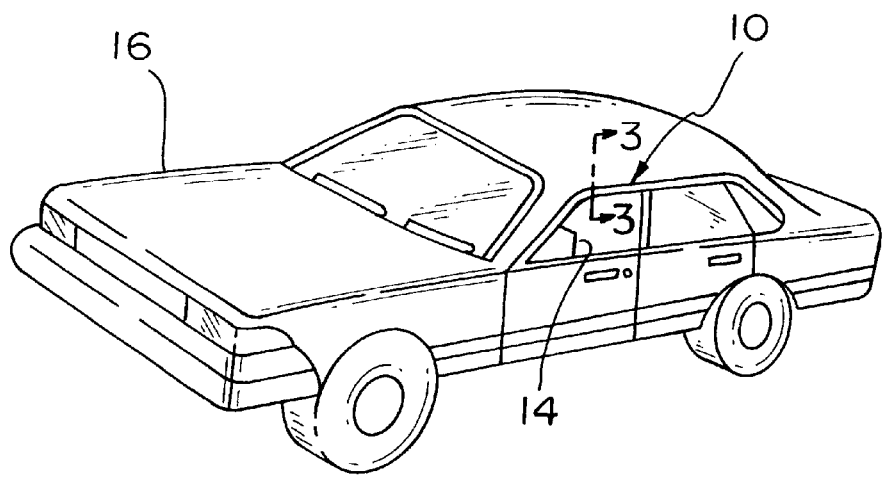
FIG. 1 is a perspective view of a weather seal on a motor vehicle.

Referring to FIG. 1, the present invention may be configured as a seal 10 for selectively contacting a movable panel 14 such as a glass window or door in an automobile 16.

Figure 3:
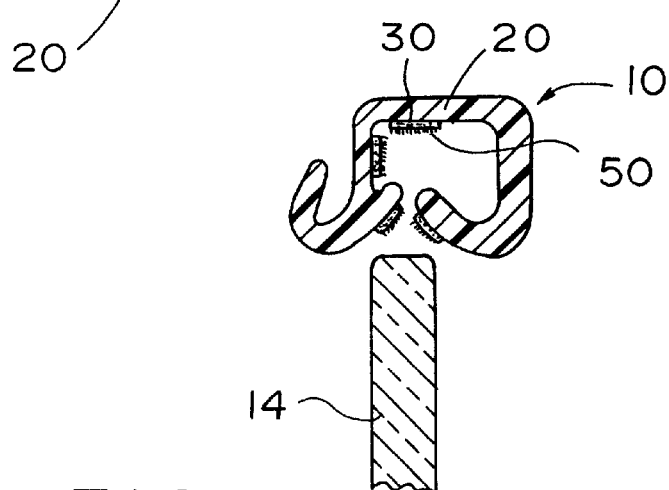
FIG. 3 is a cross sectional view taken along lines 3—3 of FIG. 1.
Figure 4:
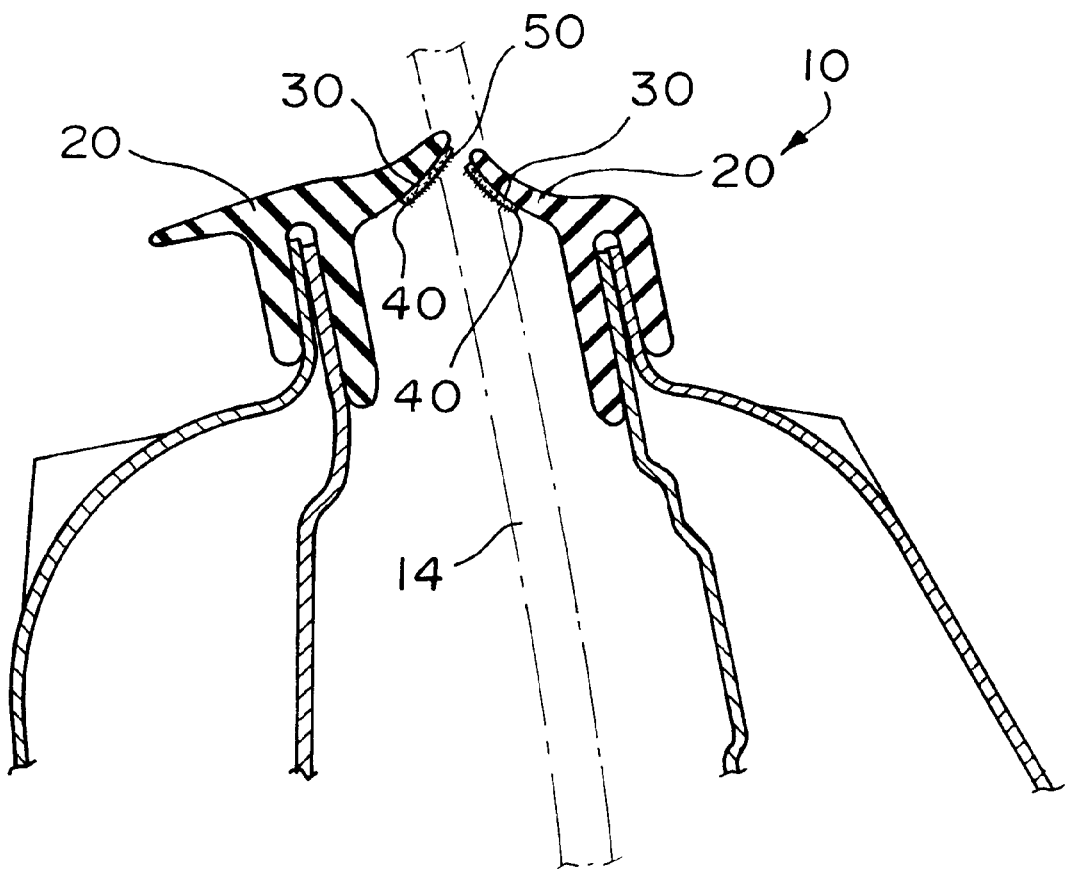
FIG. 4 is a cross sectional view of a configuration of the seal located as a belt line seal.
Figure 5:
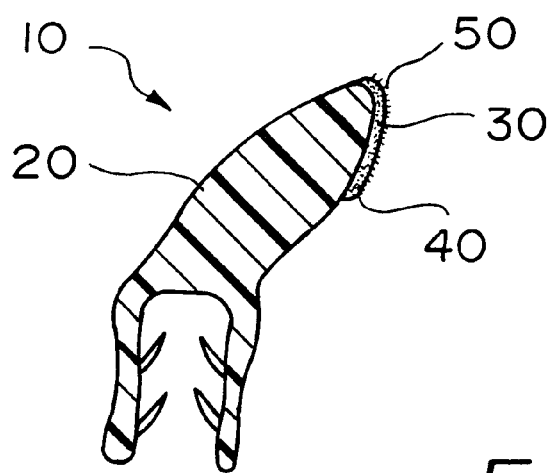
FIG. 5 is an alternative configuration of a belt line seal.

The seal 10 may be employed as a glass guidance component including window channels (FIGS. 2 and 3) and belt line seals (FIGS. 4 and 5).

In each configuration, the present seal 10 includes a base 20, a reservoir layer 30, an adhesive 40 and a contacting layer 50. The base 20 extends the length of the seal 10 and supports the reservoir layer 30. The adhesive 40 is located in the reservoir layer 30 and bonds the contacting layer 50 to the reservoir layer 30 and hence the base 20.

It is understood the seal 10 may be employed with further components, such as a frame or channel into which the seal is disposed. In a further configuration, additional layers may be formed or connected to the contacting layer.

The Base

Figure 2:
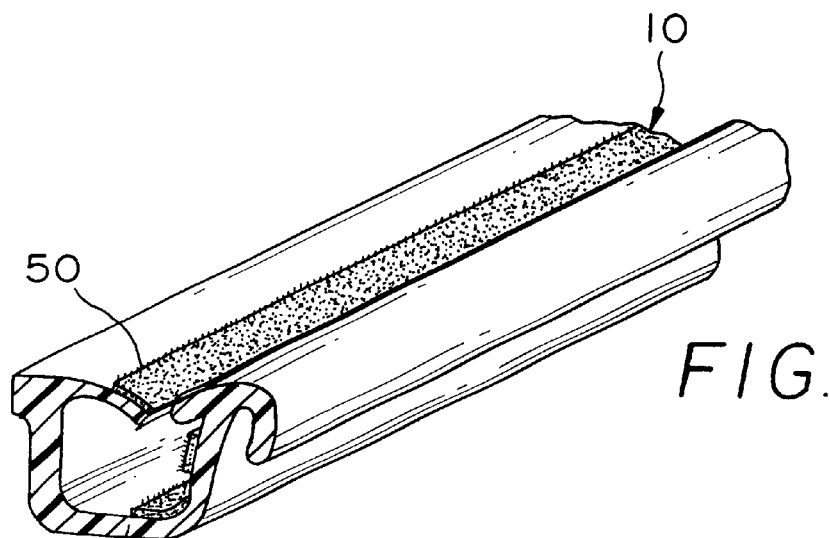
FIG. 2 is a partial cross sectional perspective view of a portion of the weather seal.

The base 20 may be formed by any of a variety of materials and in a variety of configurations such as "U", "C", "J" or other profiles. For the purpose of the description, the invention is shown in FIGS. 2 and 3 as a "U" shaped channel having a plurality of glass contacting areas. It is understood the base 20 may have a finger shape as shown in the belt line configurations of FIGS. 4 and 5.

As shown in FIGS. 7–10, the base 20 may include surface contours 24 such as protrusions and recesses. The surface contours 24 may extend the length of the seal 10 or along selected portions.

The base 20 may include reinforcing members such as stamped metal or wire carriers, or longitudinal reinforcing elements, depending upon the intended operating environment and materials of construction.

In a preferred construction, the base 20 is an extruded member formed by extruding an elastomer, preferably an EPDM rubber. The extrusion may be an initially flat configuration which is subsequently formed into the desired profile, such as the present U shape.

The base 20 can be formed from any resilient material such as a rubber, for example, natural rubber, styrene-butadiene rubber (SBR), ethylene-propylene rubber (EPR) or ethylene-propylene-diene-monomer (EPDM) rubber, or any combinations thereof. EPDM is preferred and exhibits good compression set, durability and resistance to weathering.

Alternatively, the base 20 may be formed by a combination of materials to provide different rigidities along the length of the base. For example, portions may be formed of thermoplastic or thermoset materials, or may be formed with varying carriers.

It is contemplated the base 20 may be attached or incorporated into a frame for attachment to the motor vehicle. The frame may be formed of a relatively rigid material such as thermoplastics or TPE. Alternatively, the frame may be formed of metal or even a portion of the vehicle itself. In those configurations employing TPE, the TPE portions of the carrier can be formed from a number of different plastic materials, for example, thermoplastics and thermoplastic elastomers (TPEs). TPEs are commercially available in several different brands and types. Each type can be obtained in different grades having different properties such as, hardness, tensile strength, compression, elongation, thermal stability and colorability. Selection of the appropriate TPE for a particular application depends on a suitable combination of such properties. Types of TPEs which are particularly useful for the channel seal are the styrenic block copolymers, rubber-polyolefin blends, elastomeric alloys, thermoplastic alloys, thermoplastic elastomeric alloys, thermoplastic ionomers, thermoplastic polyurethanes, polyvinyl chlorides and blends thereof.

Reservoir Layer

The reservoir layer 30 is disposed on the base 20 in the location of the intended areas of contact with the panel 14. It is understood the reservoir layer 30 may be formed along different longitudinal portions of the base 20 as well as having a varying thickness or width as dictated by the intended use of the seal 10. The reservoir layer 30 functions to retain the adhesive 40 prior to bonding with the contacting layer 50. In addition, depending upon the configuration of the reservoir layer 30, the reservoir layer may provide noise suppression, vibration reduction and accommodate variations in the panel 14.

Figure 6:
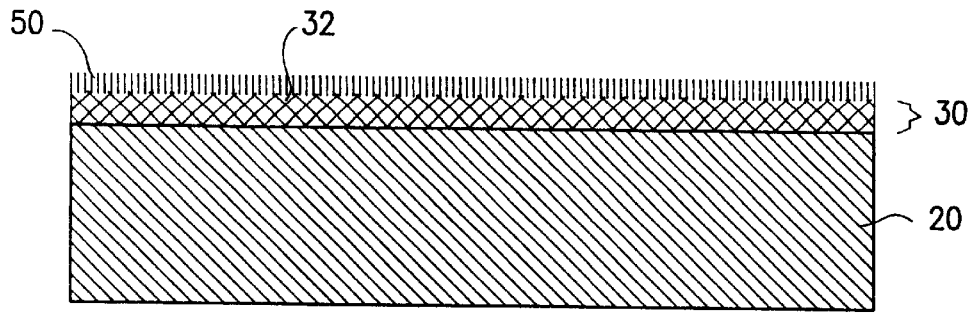
FIG. 6 is an enlarged cross sectional schematic view of a configuration of the seal.
Figure 7:
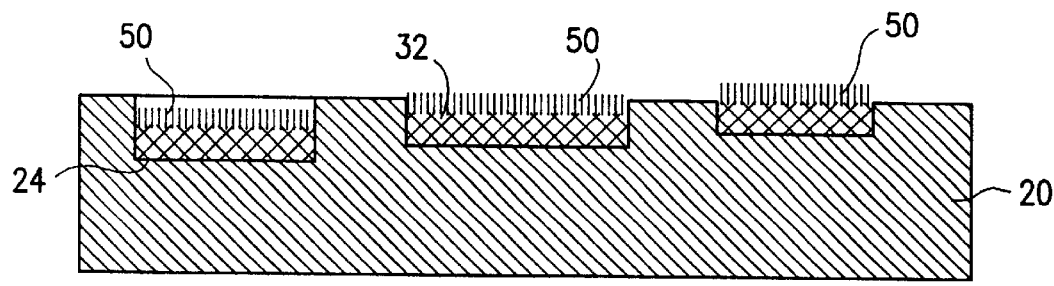
FIG. 7 is an enlarged cross sectional schematic view of alternative configurations of the seal.
Figure 9:
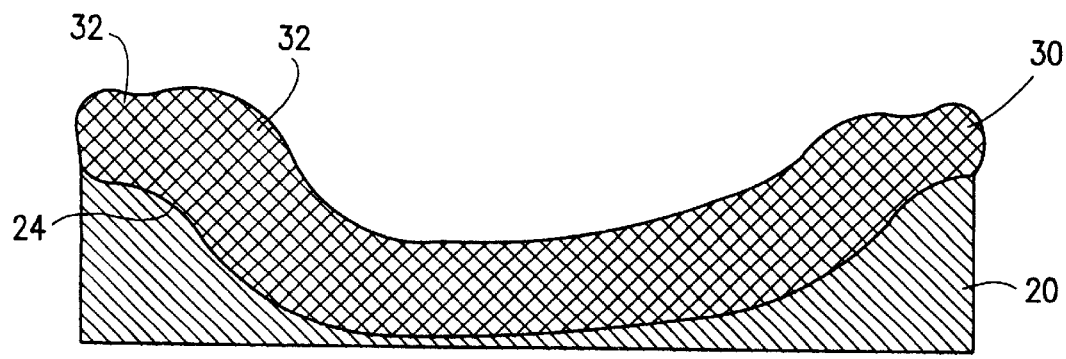
FIG. 9 is another enlarged cross sectional schematic view of a further configuration of the seal.
Figure 10:
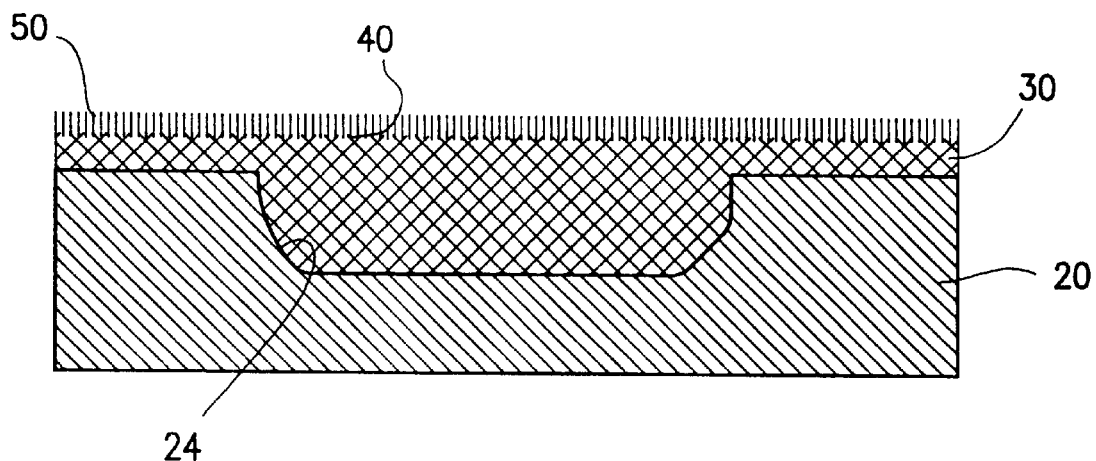
FIG. 10 is a further enlarged cross sectional schematic view of another configuration of the seal.
Figure 11:
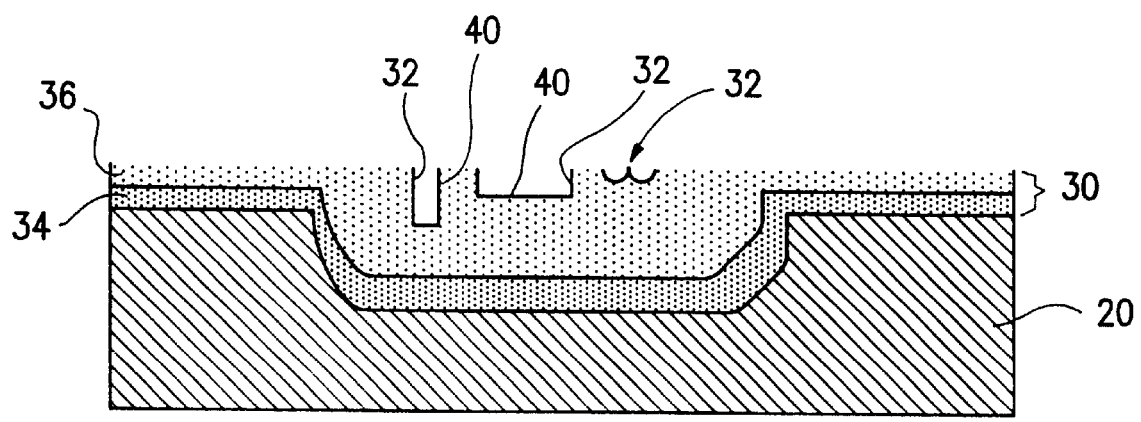
FIG. 11 is an enlarged cross sectional schematic view of a further configuration of the reservoir layer.

As shown in FIGS. 6, 7 and 9, the reservoir layer 30 may form a corresponding surface to the surface contours 24 in the base 20. Thus the reservoir layer 30 and hence contacting layer 50 will exhibit a similar profile to the surface contours 24 in the base 20. Alternatively, as shown in FIG. 10, the surface contours 24 of the base 20 may be filled or absorbed by the reservoir layer 30 so that the contacting layer 50 is relatively planar. Thus, the thickness of compressible reservoir layer 30 may be varied without changing a relatively planar surface for the contacting layer 50.

Figure 8:
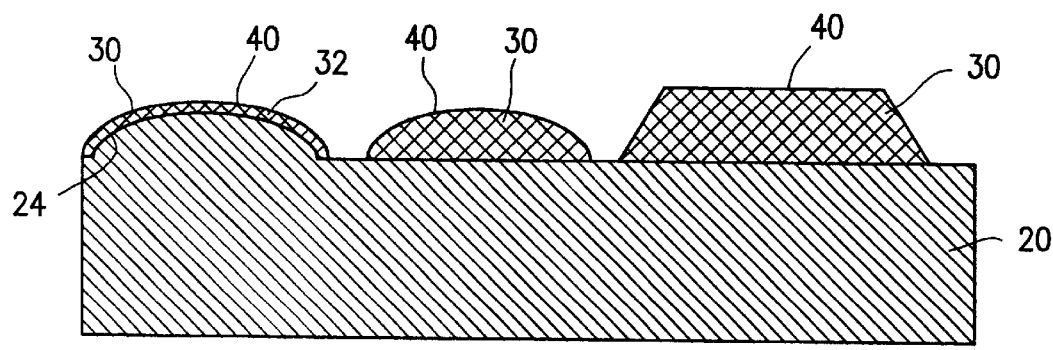
FIG. 8 is an enlarged cross sectional schematic view of a further configuration of the seal.

In addition, referring to FIG. 8, the cross sectional profile of the reservoir layer 30 may be any configuration. For example, the reservoir layer 30 may have a generally planar surface for supporting the contacting layer 50. Referring to FIGS. 6 and 7, the planar surface may be raised with respect to an adjacent portion of the base 20, generally co-planar with the adjacent portion of the base or recessed with respect to the adjacent portion of the base. It is understood that different sections of the reservoir layer 30 may occupy different locations with respect to the base 20.

As shown in FIG. 8, the reservoir layer 30 may have a curved or arcuate surface such as a generally concave or convex surface for supporting the contacting layer 50. As with the planar surface of the reservoir layer 30, the arcuate surface may be above, below or co-planar with the adjacent portion of the base 20 as well as any combination thereof.

In addition, the reservoir layer 30 may be constructed to assist in accommodating variations in the panel 14, reducing vibration of the panel or the motor vehicle and reducing noise transmission across the seal interface. Upon forming the reservoir layer 30 to have a generally resilient and compressible structure such as a cellular, sponge or foam structure of a sufficient thickness, the reservoir layer can flex and compress to accommodate variations in the curvature, thickness or mounting of the panel 14 relative to the vehicle 16 or the seal 10. That is, portions of the reservoir layer 30 may be significantly compressed from contact between the panel 14 and the contacting layer 50, while other portions of the reservoir layer may be only slightly or minimally compressed. Thus, the seal 10 may contact the panel 14 along the length of the seal.

As the seal 10 contacts the panel 14 along the entire length of the length of the seal, vibrational motion between the panel and the vehicle 16 can be reduced.

In addition, by employing the resilient-compressible structure of the reservoir layer 30 to urge the contacting layer 50 against the panel 14 along the length of the seal 10, noise transmission across the seal-panel interface is reduced.

Preferably, the reservoir layer 30 is an open celled structure having a multiplicity of open cells 32 and readily attached to the base 20. In one configuration, the reservoir layer 30 is sufficiently bonded to the base 20 so that non destructive separation is precluded. The reservoir layer 30 is constructed so that the interstitial voids defined by the open cell structure are sized to retain a sufficient volume of adhesive 40 to provide bonding for the contacting layer 50.

While the term "open cell" is used, it is intended to encompass a surface that is porous, recessed as well as a surface that includes cavities, pits or pockets. In addition, the reservoir layer 30 may include open cells, closed cells or a combination of both open cells and closed cells. Thus, the reservoir layer 30 may be formed to a have a given percentage of open cells and a given percentage of closed cells. It is further contemplated that the open cells and the closed cells may be uniformly disposed about the reservoir layer 30, or generally restricted to specific locations. That is, the reservoir layer 30 may be formed with open cells in the desired area of the adhesive 40, with the closed cells generally rejecting the adhesive 40. Alternatively, a surface of the reservoir layer 30 may be configured with raised or recessed portions to aid in locating or retaining the adhesive 40 The raised or recessed portions may be formed of open cells, closed cells or a combination of open cells and closed cells. Further, it is possible to employ a material in the reservoir layer 30 that has through holes, and upon attaching the material to the base 20, the through holes are closed by the base at one end thereby forming a cell 32 for retaining the adhesive 40.

The cross sectional profile of the reservoir layer 30 and the cell structure of the reservoir layer can be used in receiving, locating and distributing the adhesive 40 and hence contacting layer 50.

The open cell 32 structure, referred to as a sponge, may be formed by employing an open cell structure, or treating an initially closed cell structure. Open cells may be formed from closed cells by surface treatments such as chemical treatments including etching or burning, mechanical treatments including abrading, buffing or burnishing as well as laser ablation. The opening of the closed cells may be accomplished before or after the reservoir layer 30 is attached to the base 20. That is, a closed cell sponge may be attached to the base 20 and then treated to form the open cells in the desired locations.

Preferably, the reservoir layer 30 is an open cell sponge coextruded with the base 20. The open cell sponge may be formed by employing a blowing agent during extrusion. By controlling the blowing agent, the reservoir layer 30 may have a range of ratios between the open cells and the closed cells. The reservoir layer 30 may be any of a variety of materials such as thermoplastic, thermosetting, TPEs or any other material capable of being formed in an open cell structure. The reservoir layer 30 may be formed of any material which is capable of forming an open cell structure or being configured into an open cell structure. Alternatively, the reservoir layer 30 can hold the pits, pockets or cavities.

Preferably, the reservoir layer 30 has a sufficient thickness to retain the adhesive 40 during the residence time of the adhesive prior to applying the contacting layer 50 and substantially preclude the travel of the adhesive beyond the reservoir layer. Thus, the reservoir layer 30 may range from a substantially single layer of open cells to a thickness as much as an ⅛" or more. It is anticipated that to provide as compact a seal 10 as possible, that the reservoir layer 30 will be formed in a thinner rather than a thicker configuration.

The reservoir layer 30 may also include sublayers to assist in the functioning of the seal 10. For example, the reservoir layer 30 may have a closed cell sublayer 34 adjacent the base 20 and a generally open cell layer 36 for bonding to the contacting layer 50. Further, different portions of the reservoir layer 30 may have different sublayer structure.

Adhesive

The adhesive 40 is disposed within the boundaries of the reservoir layer 30 and in the open cells 32. The adhesive 40 is selected to bond the contacting layer 50 to the reservoir layer 30 and hence the base 20. Although the adhesive 40 may be any of variety of commercially available adhesives, it has been found advantageous to employ either a one or a two part adhesive. A suitable adhesive 40 is a urethane based, two part adhesive such as CHEMLOK sold by Lord Corporation.

The adhesive 40 is applied to at least a portion of the reservoir layer 30. The material and form of the reservoir layer 30 are selected in combination with the adhesive 40 such that migration of the adhesive beyond the edge of the reservoir layer is generally precluded. That is, any capillary forces and cohesive forces tend to retain the adhesive 40 within the reservoir layer 30 and preclude migration of the adhesive beyond the reservoir layer.

The adhesive 40 may penetrate only the top layer of open cells. Alternatively, the open cell structure., the adhesive 40 and the residence time may be selected so that the adhesive penetrates a substantial portion of the sponge layer. To preserve the resilient nature of the reservoir layer 30 and the associated benefits, it is generally desirable to use only a sufficient amount of adhesive 40 to bond to the contacting layer 50 without introducing significant rigidity into the reservoir layer 30.

In a preferred configuration, the reservoir layer 30 and the adhesive 40 are selected to form a relatively straight sight line along a length of the seal 10.

Contacting Layer

The contacting layer 50 is disposed on the adhesive 40 retained in the reservoir layer 30. The contacting layer 50 may be any of a variety of materials such as flock or a ribbon of additional material such as lubricious plastics including thermoplastics and thermosetting materials as well as combinations thereof. Further, the contacting layer 50 may include felt, pile, slip coatings or combinations thereof.

The reservoir layer 30, the adhesive 40 and the contacting layer 50 are selected to be compatible with sufficient adhering characteristics to substantially preclude unintended separation.

Manufacture

Preferably, the base 20 is extruded and the reservoir layer 30 is either coextruded or subsequently extruded onto predetermined portions of the base. In view of the coextruding process, the reservoir layer 30 may be accurately located on the base 20. In addition, the extruding process allows the reservoir layer 30 to be intermittent or varying in profile. As previously stated, the reservoir layer 30 may be formed by employing a blowing agent during the extrusion process, or subsequently formed from a closed cell sponge by the recited treatments.

An adhesive applicator is aligned to dispose the adhesive 40 along the reservoir layer. The area over which the adhesive 40 is applied depends upon a number of factors including the viscosity of the adhesive, the binding nature of the adhesive 40, the cell 32 structure of the reservoir layer 30 and the residence time prior to application of the contacting layer 50. That is, for a relatively viscous adhesive 40 and tortuous cell structure wherein the contacting layer 50 is promptly applied, the adhesive may be located substantially adjacent to the edge of the reservoir layer 30.

Alternatively, if the adhesive 40 has a relatively low viscosity and the open cell structure of the reservoir layer 30 does not represent a significant barrier to flow, the adhesive may be disposed along a more central portion of the reservoir layer. During the residence time, the adhesive 40 will tend to flow to occupy the entire surface of the reservoir layer 30.

The contacting layer 50 is then applied to the adhesive 40 in the reservoir layer 30 to bond to the reservoir layer and hence to the base 20. The contacting layer 50 may be flock and applied as known in the art to the adhesive 40. Alternatively, the contacting layer 50 may be a ribbon of relatively lubricious material that adheres to the adhesive 40. As the adhesive 40 may be formed in the relatively straight sight line, the contacting layer 50 will be correspondingly straight edged.

The present invention offers the benefit of being able to locate the reservoir layer 30 with closer tolerances through the extrusion process. As the reservoir layer 30 is accurately located and the adhesive 40 may be applied to only a portion of the reservoir layer and migrate to a larger area, with reduced leakage, the amount of adhesive and flock material required is reduced. In addition, the present invention does not require the use of surface treatments such as corona treatment prior to the application of the flock.

The present invention also provides vibration absorption, accommodates variations in the panel 14, and reduces noise transmission across the seal 10. The seal 10 reduces the transmission of noise from the panel 14 through the seal to the vehicle. In addition, the seal 10 reduces the noise transmission along the panel 14. That is, the seal 10 effectively forms a wall that reduces noise transmission.

While the invention has been described with reference to preferred embodiments, it will be understood by those skilled in the art that various changes may be made and equivalents may be substituted for elements thereof without departing from the scope of the invention. In addition, many modifications may be made to adapt a particular situation of material to the teachings of the invention without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A seal for providing an interface for motion relative to a panel on a motor vehicle, comprising:
    (a) a base;
    (b) a resilient compressible sponge layer on a portion of the base, the sponge layer formed of a first material and having a multiplicity of open cells;
    (c) an adhesive disposed in the multiplicity of open cells, the adhesive formed of a second different material; and
    (d) a contacting layer bonded to the adhesive for contacting the panel during motion relative to the seal and precluding unintended separation from the adhesive and the sponge layer.

2. The seal of claim 1, wherein the sponge layer has a sufficient thickness to reduce noise transmission from the panel to the seal and reduce noise transmission across the seal.

3. The seal of claim 1, wherein the base includes a surface contour.

4. The seal of claim 3, wherein the sponge layer includes an outer surface substantially parallel to the surface contour.

5. The seal of claim 3, wherein the sponge layer includes an outer surface non parallel to the surface contour.

6. A seal for a motor vehicle, comprising:
    (a) a base;
    (b) a reservoir layer formed of a first material on a portion of the base, the reservoir layer including a multiplicity of open cells;
    (c) an adhesive formed of a second different material and disposed in the multiplicity of open cells; and
    (d) a contacting layer bonded to the adhesive in the reservoir layer.

7. The seal of claim 6, wherein the base is substantially non porous to the adhesive.

8. The seal of claim 6, wherein the contacting layer is one of a thermoplastic material, a thermosetting material, felt, pile, slip coating, flock and combinations thereof.

9. The seal of claim 6, wherein the reservoir layer has a lower density than the base.

10. The seal of claim 6, wherein the reservoir layer includes open cells and closed cells.

11. The seal of claim 6, wherein the base has a surface contour.

12. The seal of claim 11, wherein the reservoir layer has an outer surface generally corresponding to the surface contour of the base.

13. The seal of claim 6, wherein the reservoir layer has an outer surface substantially free of the surface contour of the base.

14. The seal of claim 6, wherein the reservoir layer has a plurality of sublayers.

15. The seal of claim 6, wherein the reservoir layer has a generally arcuate outer surface.

16. The seal of claim 6, wherein the reservoir layer has a generally planar outer surface.

17. The seal of claim 6, wherein the open cells are in a form of one of a pit, a cavity and a recess.

18. A method of seal for a motor vehicle, comprising:
    (a) forming a base;
    (b) disposing a sponge layer of a first material on a portion of the base, the sponge layer having a multiplicity of open cells;
    (c) disposing an adhesive of a second different material in the open cells; and
    (d) bonding a contact layer to the adhesive.

19. The method of claim 18, further comprising employing one of a thermoplastic material, a thermosetting material, felt, pile, slip coating, flock and combinations thereof as the contact layer.

* * * * *